March 24, 1959 E. R. ZIEGLER 2,878,505
WINDSHIELD CLEANING SYSTEM
Filed Jan. 18, 1957 2 Sheets-Sheet 1
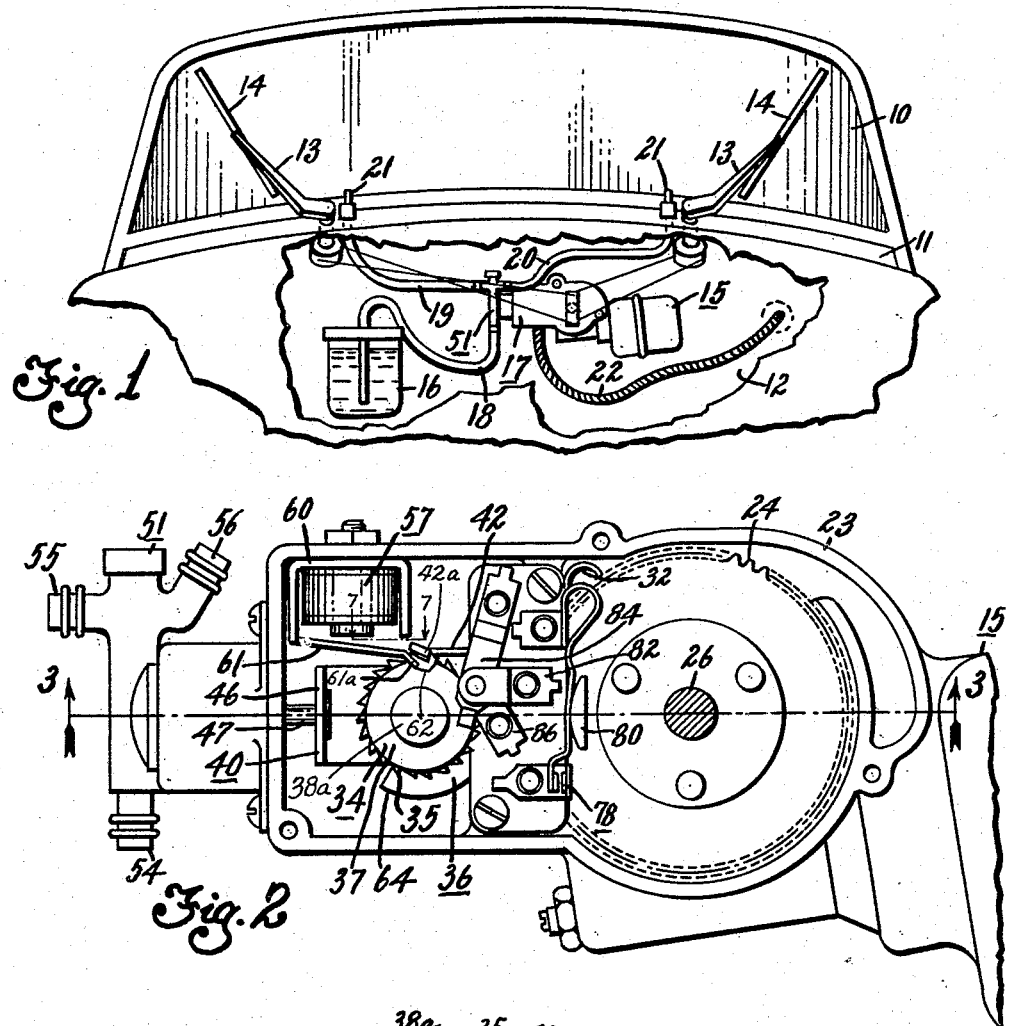
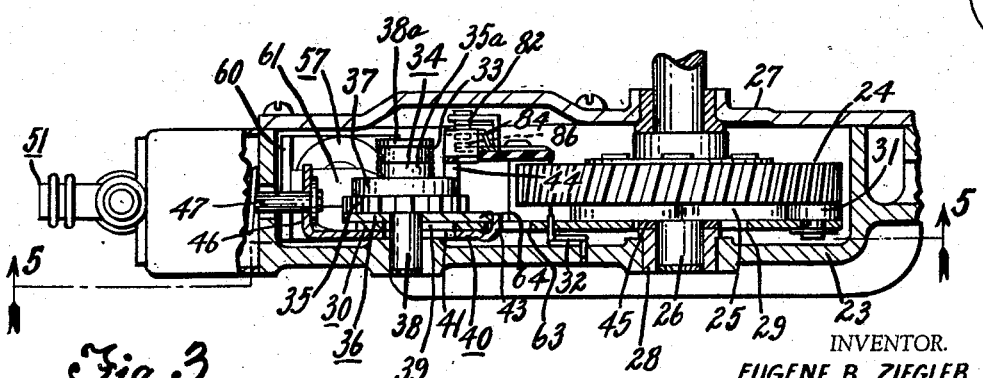
INVENTOR.
EUGENE R. ZIEGLER
BY
G. H. Strickland
HIS ATTORNEY March 24, 1959     E. R. ZIEGLER     2,878,505
WINDSHIELD CLEANING SYSTEM
Filed Jan. 18, 1957     2 Sheets-Sheet 2
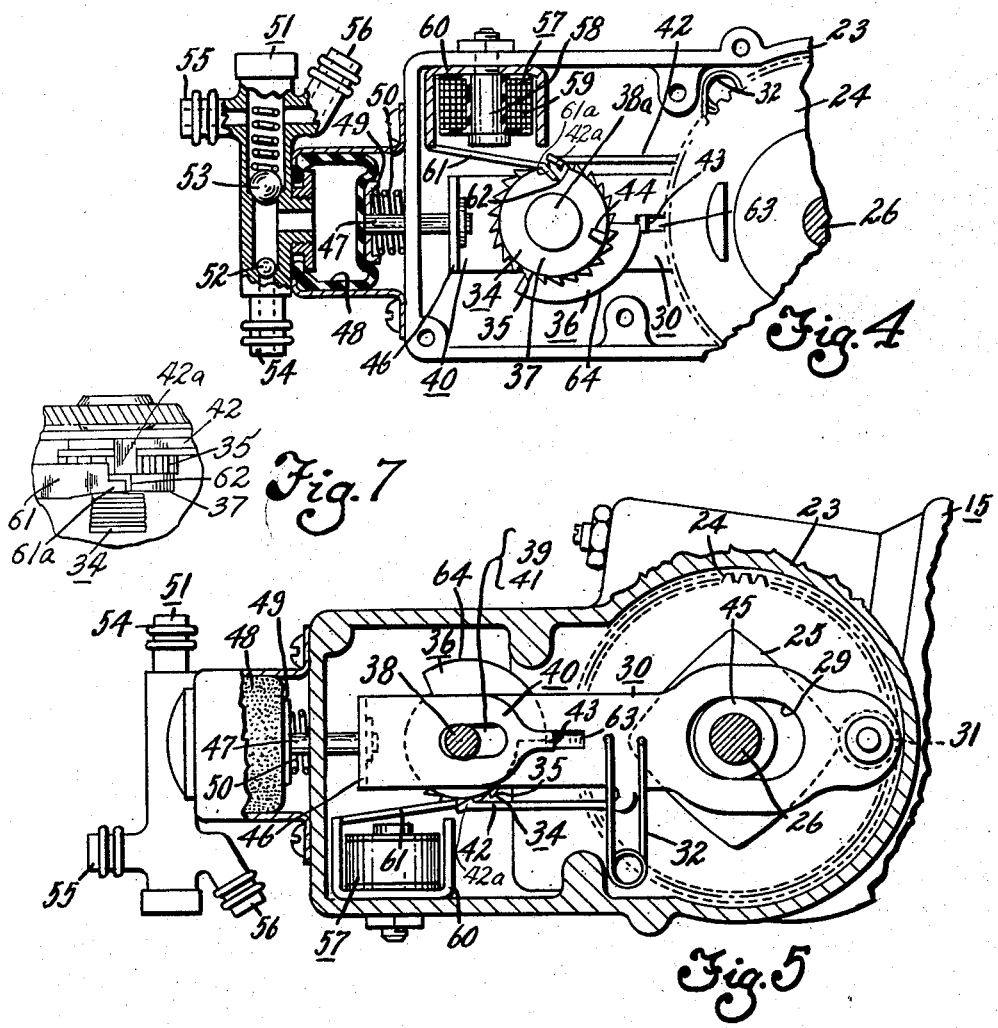
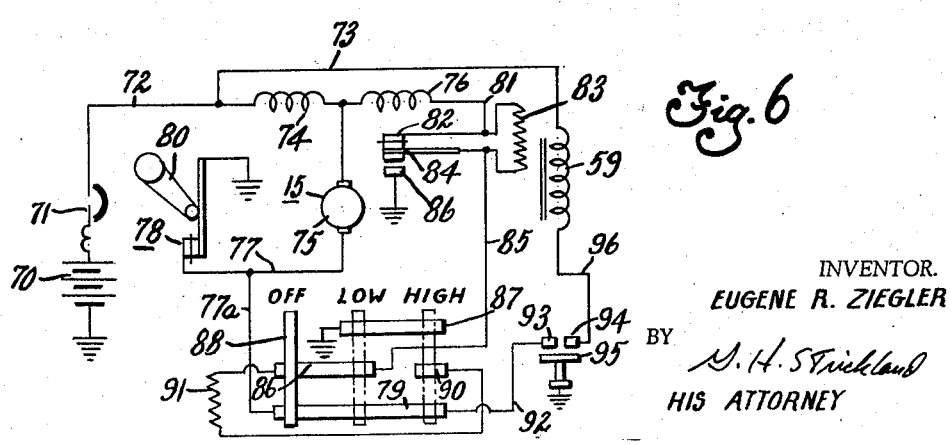
INVENTOR.
EUGENE R. ZIEGLER
BY
HIS ATTORNEY

United States Patent Office 2,878,505
Patented Mar. 24, 1959

2,878,505

WINDSHIELD CLEANING SYSTEM

Eugene R. Ziegler, Spencerport, N.Y., assignor to General Motors Corporation, Detroit, Mich., a corporation of Delaware Application January 18, 1957, Serial No. 634,867

24 Claims. (Cl. 15—250.4)

This invention pertains to the art of windshield cleaning, and particularly to a system wherein solvent is sprayed onto a windshield conjointly with movement of a windshield wiper blade thereacross to clean the windshield.

Heretofore, it has been proposed to operate a windshield wiper conjointly with a windshield washer so that the liquid solvent is sprayed onto the windshield, spread over the windshield surface by the wiper, and removed by the wiper to clean the windshield surface. In addition, it has been proposed to interconnect a windshield washer and a windshield wiper using a control system whereby actuation of the windshield washer automatically initiates operation of the windshield wiper so that the windshield washer and wiper operate conjointly, and after cessation of washer operation, wiper operation is continued for a predetermined time interval so as to dry the windshield. An arrangement of this type is disclosed in the Oishei Patent No. 2,743,473. The present invention relates to an improved windshield cleaning system wherein the washer pump is actuated by the wiper motor thereby eliminating the necessity for an independent washer pump motor, together with means for automatically counting the number of wiping strokes for drying the windshield after cessation of washer operation and thereafter arresting the wiper. Accordingly, among my objects are the provision of an electric motor, or other rotary means, driven intermittent squirt type washer pump; the further provision of a washer pump actuated by a wiper motor including means for disabling the operative connection between the wiper motor and the washer pump; the further provision of a windshield cleaning system for effecting conjoint operation of a washer pump and a wiper motor; and the further provision of a windshield cleaning system including means operable to effect conjoint operation of a washer pump and a wiper motor including means operable to arrest operation of a wiper motor after the wiper motor effects a predetermined number of strokes beyond the washer operation; and the still further provision of a washer pump assembly designed to prevent damage to the actuating mechanism if the solvent freezes.

The aforementioned and other objects are accomplished in the present invention by incorporating a selectively connectible drive between the wiper motor and the washer pump. However, the washer unit may be readily attached to the motor as an accessory item in the field. Specifically, the wiper motor may be of the type disclosed in copending application Serial No. 551,800 filed December 8, 1955, in the name of Elmer E. Reese and assigned to the assignee of this invention. Thus, the wiper is driven by an electric motor through a worm gear. The wiper motor includes drive mechanism for converting rotation into oscillation and a variable throw crank mechanism for varying the amplitude of oscillation imparted to the wiper blades so as to move them to a depressed position when the wiper motor is deenergized. The worm gear has attached thereto a multiple lobe cam, which cam is operatively connected with a reciprocable plunger so as to effect a plurality of strokes of the plunger for every revolution of the worm gear.

The plunger has formed thereon a pawl engageable with a ratchet wheel. To control the operation of the washer pump, an electromagnet is employed, the armature of the electromagnet constituting a ramp for preventing engagement of the plunger driven pawl with the ratchet wheel when the electromagnet is deenergized. Thus, during normal wiper operation, the pump is not actuated thereby reducing the load imposed upon the wiper motor and preventing water from being used except when required.

Upon energization of the electromagnet, the armature thereof is displaced so that the plunger operated pawl engages the ratchet wheel and moves it throughout a plurality of strokes during every revolution of the worm gear. The washer pump comprises a flexible rubber, or rubber-like, bellows or piston having a rod attached thereto. The rod is biased in one direction by means of a compression spring, and can be moved in the opposite direction by the plunger during a portion of every revolution of the ratchet wheel. However, during the later part of the complete cycle (dry portion), reciprocation of the plunger does not actuate the washer pump due to engagement between a cam surface integral with the ratchet wheel, constituting programing means, and a tank on the pump operating rod. Once the ratchet wheel has been rotated one tooth or more, the pump will be intermittently actuated so that a series of intermittent squirts of liquid solvent will be sprayed onto the windshield. After a predetermined number of pump strokes, as determined by a predetermined angular movement of the ratchet wheel, the driving connection between the plunger and the pump actuating rod will be interrupted, and accordingly, continued reciprocation of the plunger will merely rotate the ratchet wheel. It is during this period that the windshield is dried by the wiper blades, the number of wiping strokes being counted by the ratchet wheel so that when the ratchet wheel returns to its initial position, the wiper motor will be arrested.

Control of the wiper motor can be effected manually to select either a high or low speed as well as a park, or off, position. To clean the windshield, a push button is incorporated for completing a circuit to the electromagnet and wiper motor for effecting conjoint operation of the windshield wiper motor and the washer pump, and after the washer pump has stopped, continued operation of the wiper motor for a predetermined number of cycles after which operation of the wiper motor is automatically arrested.

Further objects and advantages of the present invention will be apparent from the following description, reference being had to the accompanying drawings wherein a preferred embodiment of the present invention is clearly shown.

In the drawings:

Figure 1 is a fragmentary view in elevation, with certain parts broken away, of a vehicle having the windshield cleaning system of this invention.

Figure 2 is a view in elevation of a combined windshield motor and washer pump with the cover removed.

Figure 3 is a fragmentary sectional view taken along line 3—3 of Figure 2.

Figure 4 is a fragmentary view, partly in section and partly in elevation, similar to Figure 2.

Figure 5 is a fragmentary view in elevation taken along line 5—5 of Figure 3.

Figure 6 is a circuit diagram of the combined wiper and washer motor control system of this invention.

Figure 7 is a fragmentary view, partly in section and partly in elevation, taken along line 7—7 of Figure 2.

With reference to Figure 1, a vehicle is shown having a windshield 10 and a cowl 11 and a fire wall 12. In accordance with conventional practice, the vehicle is equipped with a pair of windshield wipers including arms 13 and blades 14 which are movable simultaneously over asymetrical paths during energization of a wiper motor 15 through a cable drive, as shown. The wiper motor is attached to the vehicle fire wall 12, as is a reservoir 16 for liquid solvent. The wiper motor 15 has attached thereto a washer pump 17, the intake side of which is connected by conduit 18 to the reservoir, and the discharge side thereof is connected by conduits 19 and 20 to a pair of nozzles 21 located in the cowl 11, or otherwise positioned, and arranged to discharge liquid solvent onto the windshield into the path of the wiper blades 14. The cleaning mechanism may be controlled by a pair of Bowden wires which are enclosed in a sheath 22, one Bowden control wire being used to control operation of the wiper motor alone, while the other Bowden wire is used to control conjoint operation of the washer and wiper motor.

With particular reference to Figures 4 and 5, the housing for the electric motor 15 is formed with an integral extension, designated by the numeral 23. However, the washer unit may be added as an accessory. As alluded to hereinbefore, the electric wiper motor is arranged to drive motion convertiing mechanism of the type shown in the aforementioned copending application, and thus includes a worm gear 24. The worm gear has attached thereto a four lobe cam 25. It is to be understood that the number of lobes on the cam can be varied to suit the requirements of any particular vehicle installation, and thus reference to a four lobe cam is only exemplary and is not to be construed as a limitation.

With particular reference to Figure 3, it can be seen that the worm gear 24 is attached to a shaft 26 which is journalled within the housing extension 23. The housing is also shown having a cover plate 27 attached thereto for enclosing the washer pump actuating mechanism to be described. The shaft 26 has a washer 45 disposed between a cam 25 and a bar 28 which supports the shaft 26. The washer 45, as seen in Figure 5, is disposed within an elongated slot 29 of a reciprocating plunger 30. The reciprocating plunger 30 has a cam follower 31 attached thereto, which is maintained in engagement with the cam 25 by means of a hairpin spring 32, one end of which is attached to the plunger 30 and the other end of which extends into an aperture in the housing 23, as shown in Figure 3. The intermediate portion of the hairpin spring 32 is free floating.

The plunger 30 is disposed in contiguous relation to a ratchet wheel assembly 34. As seen in Figure 3, the ratchet wheel assembly, or ratchet cam, 34 comprises a ratchet wheel 35, a cam 36 disposed on one side of the ratchet wheel 35, a second cam 37 disposed on the other side of the ratchet wheel 35, these parts being rotatably journalled on a shaft 38 fixedly mounted in the housing 23.

The shaft 38 has a head portion 38a which is seated against a shoulder 35a of the ratchet wheel assembly. The head portion 38a is engageable with one end of a coil spring clutch 33, the other end of which is attached to the shoulder 35a. The coil spring clutch prevents reverse rotation of the ratchet wheel.

As seen in Figures 3 and 5, the plunger 30 has an elongated slot 39 therein through which the shaft 38 extends. Moreover, the plunger 30 is disposed between the cam 36 and a bracket 40, likewise having an elongated slot 41 through which the shaft 38 extends. The plunger 30 is formed with a drive pawl 42 having a lateral extension 42a, as seen in Figures 5 and 7, which is engageable with the ratchet wheel 35 so that upon reciprocation of the plunger 30, it may effect rotation of the ratchet wheel 35 in the clockwise direction as viewed in Figures 2 and 4 and in the counterclockwise direction as viewed in Figure 5. The bracket 40 has an upstruck tang 43. The cam disc 37 includes an actuating portion 44 arranged to engage a switch contact arm 84.

As seen in Figures 3, 4 and 5, the bracket 40 has an apertured end portion 46 which slideably engages a rod 47 of a washer pump. The washer pump comprises a flexible rubber, or rubber-like, bellows 48, the rod being attached to an annular member 49, which constitutes a seat for one end of a compression spring 50, the other end of which engages the housing 23. It is pointed out that the bellows 48 are compressed by spring 50 to effect the discharge stroke thereof, the spring 50 being compressed through the rod 47, and the bracket 40 by the plunger 30 during the intake stroke thereof. Thus, if perchance, liquid solvent within the bellows 48 should freeze, the actuating mechanism will not be damaged. When the tang 43 engages cam surface 64, the bracket 40 will not be reciprocated by the plunger 30 due to the lost motion connection therebetween constituted by slot 63. The bellows 48 communicates with a conventional inlet and outlet check valve assembly 51 comprising an inlet check valve 52 and a spring biased outlet check valve 53. The inlet check valve connects with a nipple which is attached to the intake conduit 18 as shown in Figure 1. The discharge check valve 53 connects with a pair of nipples 55 and 56 which are connected to conduits 19 and 20, respectively.

With particular reference to Figures 2, 4 and 5, the combined washer pump and wiper motor assembly also includes an electromagnet generally indicated by the numeral 57. This electromagnet includes a core 58 encircled by a winding 59. The core and the winding are carried by a bracket 60 attached to the housing 23 to which an armature 61 is pivotally connected. The armature 61 constitutes a ramp, an offset end portion 61a of which is engageable in a notch 62 formed in the cam 37 when the electromagnet is deenergized and the washing cycle is complete. The end portion 61a of the armature 61 is shown disposed in the notch 62 of the gear wheel 37 in Figures 2 and 4. When the end of the armature 61 is disposed within the notch 62, reciprocation of the plunger 30 and its drive pawl 42 will not effect rotation of the ratchet wheel assembly 34, since the drive pawl 42 rides up on the ramp formed by the armature 61 and thus does not engage a ratchet tooth. However, when the electromagnet 57 is energized the armature 61 is moved into engagement with the core 58. This movement of the armature is permitted since the offset end portion 61a does not engage the extension 42a of the pawl as clearly shown in Figure 7. Accordingly, the drive pawl extension 42a engages a tooth on the ratchet wheel 35 so as to move the ratchet wheel 35 through a distance of one or more teeth during each stroke of the plunger 30. Moreover, after the first tooth movement of the ratchet wheel, the end 61a of the armature 61 will engage the circular periphery of the cam wheel 37 at which time electromagnet may be deenergized, thereby permitting the drive pawl 42 to move the ratchet wheel through one complete revolution.

With particular reference to Figure 6, the circuit diagram for controlling the windshield wiper motor independently of the washer, as well as conjointly with the washer pump will be described. Numeral 70 indicates a battery, one terminal of which is connected to ground. The other battery terminal is connected through a thermal overload switch 71 to wire 72. Wire 72 is connected to wire 73 as well as one end of the series field winding 74 of the motor 15. The other end of the series field winding is connected to one end of the armature 75 and one end of the shunt field winding 76. The other end of the armature 75 is connected to a wire 77, the wire 77 being connected by a wire 77a to a stationary contact 79 of a wiper motor control switch. Wire 77 is also connected to one contact of a parking switch 78. The other contact of the park switch 78 is connected to ground, the park switch being controlled by a crank member 80 actuated by the motion converting mechanism as shown in the aforementioned copending application.

The other end of the shunt field winding 76 is connected to a wire 81, wire 81 being connected to a switch contact 82 and the one end of a resistor 83. The other end of the resistor 83 is connected to a movable switch contact 84 and a wire 85. The switch contact 84 may engage either contact 82 or a contact 86 which is connected to ground. The wire 85 is connected to a stationary contact 86 of the manual wiper control switch. The manual wiper control switch also includes a third stationary contact 87 as well as a movable bridging member 88. In addition, the manual control switch includes a fourth stationary contact 90 which is connected to the stationary contact 86 through a resistor 91. The contact 79 is connected by wire 92 with a stationary contact 93 of the washer switch. The washer switch also includes a second stationary contact 94 and a bridging member 95 which is connected to ground. The contact 94 is connected by wire 96 to the relay coil winding 59, the other end of which is connected to wire 73.

Operation of the control system of this invention is as follows. When it is desired to operate the wiper alone, the bridging member 88 is moved to the low speed position indicated by dotted lines in Figure 6. In this position, one end of the shunt field winding 76 is connected to ground from contact 87 through bridging member 88, wire 85, contacts 82 and 84, and wire 81. The other end of the shunt field winding is connected to the battery 70 through the series field winding 74. In addition one side of the armature 75 is connected to ground through wires 77, 77a, switch contact 79, bridging member 88 and switch contact 87. Thus the parking switch 78 which is open when the wiper motor is off, is shunted out of the circuit and the motor 15 will operate at low speed. At this time the plunger 30 reciprocates but the pump is inactive since tang 43 engages cam surface 64.

To operate the motor 15 at high speed the bridging member 88 is moved to the high speed position indicated at the dotted lines in Figure 6. In this position, a high speed resistor 91 is connected in series with the shunt field winding 76 so as to increase the motor speed. In the high speed position of the manual switch, the pump is likewise inactive. When it is desired to discontinue operation of the wiper motor, the bridging member 88 is moved to the off position, during which time energization of the motor is controlled by the series switch 79. Since the motor may be of the type disclosed in the aforementioned copending application, the motor will continue to rotate until the wiper blades have been moved to a depressed, or parked, position at which time the crank arm 80 will open the switch, 78 so as to deenergize the motor.

When the wiper motor is off by reason of the bridging member 88 being in the full line position of Figure 6, the automatic washer-wiper control system operation is as follows. When the washer bridging member 95 is momentarily depressed, the relay winding 59 is energized thereby moving the armature 61 out of the notch 62 in the cam 37. Simultaneously, with energization of the relay 57, the wiper motor 15 will be energized since stationary contact 79 is connected to ground, and thus the armature 75 is connected across the battery 70 and one end of the shunt field winding 76 is connected to ground through wire 81, engaging contacts 82, 84, wire 85, stationary contact 86 and bridging member 88. Thus, the wiper motor 15 will be energized for low speed operation. As soon as the plunger 30 effects movement of the ratchet wheel assembly 34 throughout the annular distance of one tooth on the ratchet wheel, 35, the cam portion 44 on the cam wheel 37 will move out of engagement with the contact 84 and the contact 84 will thus move into engagement with contact 86 thereby connecting the high speed resistor 83 in series with the shunt field winding 76. Thus, the wiper motor will be energized for high speed operation. Moreover, at this time reciprocation of the plunger 30 will effect reciprocation of the bracket 40, since the tang 43 thereof extends through an opening 63 in the plunger 30, as shown in Figure 3, it being noted that the tang 43 is disengaged from the cam surface 64 of the cam wheel 36 after the ratchet wheel assembly has moved throughout a distance of one tooth. Thus, the washer pump will be actuated conjointly with the wiper motor and will cause a succession of intermittent squirts of liquid solvent to be discharged onto the windshield into the path of the moving wiper blades. After rotation of the ratchet wheel which constitutes a counting means, throughout substantially 240°, the tang 43 will again engage the cam surface 64 so that continued reciprocation of the plunger 30 will not actuate the pump bellows 48. In other words, when the tang 43 engages the cam projection 64, this engagement prevents collapse of the bellows 48 by action of the spring 50, since the bracket 40 and the rod 47 cannot move further to the left than shown in Figure 4. Thus, during the remaining 120° rotation of the ratchet wheel assembly, the wiper blades are actuated for a predetermined number of strokes to dry the windshield surface. When the ratchet wheel has completed one revolution, the armature 61 falls into the notch 62 on the cam wheel 37 thereby preventing further rotation of the ratchet wheel assembly 34. Moreover, at this time the projection 44 moves the contact member 84 back into engagement with contact 82 thereby interrupting the ground circuit shunting parking switch 78 so that the parking switch 78 can deenergize the motor 15 when the wiper blade arrives at the parked position.

Thus, during the automatic washing cycle, the washer pump and the wiper motor operate conjointly for a predetermined number of wiper strokes, the wiper being operated at any desired speed, after which the wiper motor continues operation for a second predetermined number of wiping strokes and is then arrested. The washer can also be actuated when the wiper motor is operating under manual control by movement of the bridging member 88. If the wiper is operated at low speed under manual control, the washer control system will cause it to operate at high speed during the wash cycle. After completion of the wash cycle it will return to the speed setting of the manual control. If, however, the wiper motor is being operated at high speed under manual control, it will continue to do so when the washer control is actuated.

From the aforementioned it is apparent that the present invention provides a simple control system for effecting conjoint operation of a windshield washer and wiper. Moreover, this invention eliminates the necessity for a separate washer pump motor, and in addition counts the number of wiping strokes both during and after washer operation so as to prevent prolonged wiper operation due to a malfunction such as occurs with the dashpot type of coordinating mechanism presently used on some vehicles.

While the form of embodiment of the invention as herein disclosed constitutes a preferred form, it is to be understood that other forms might be adopted, as may come within the scope of the claims which follow.

What is claimed is as follows:

1. A windshield cleaning system including; a washer unit, a wiper unit, means to set both units in operation conjointly, and wiper unit stroke counting means operatively connected with said washer unit and said wiper unit and operable to automatically continue conjoint operation of said washer unit and said wiper unit for a first predetermined number of strokes of said wiper unit and then arrest the two units in sequential order that prolongs wiper operation for a second predetermined number of strokes of said wiper unit after washer operation.

2. A windshield cleaning system including, a washer unit, a wiper unit, control means for effecting conjoint operation of the washer unit and the wiper unit, means operable during said conjoint operation to continue operation of said washer unit for a first predetermined number of strokes of said wiper unit and then automatically arrest said washer unit, and means to continue operation of the wiper unit for a second predetermined number of strokes of said wiper unit after the washer unit has been arrested.

3. A windshield cleaning system including, a wiper unit, a washer pump, a single motor for effecting operation of both the wiper unit and the washer pump, means to effect wiper unit movement independent of actuation of the washer pump, means to effect conjoint operation of the washer pump and the wiper unit, and means operable during said conjoint operation to continue operation of said washer pump for a predetermined number of strokes of said wiper unit and then automatically arrest said pump.

4. A windshield cleaning system including, a wiper blade, a washer pump, a single motor operatively connected to the wiper blade and to the washer pump, means to interrupt the operative connection between the motor and the washer pump to operate the wiper blade independently of the washer pump, and means operable to operate the washer pump and the wiper blade conjointly including means operable to automatically continue wiper blade operation for a predetermined number of strokes after stopping operation of the washer pump.

5. A windshield cleaning apparatus including, a solvent reservoir, a power driven pump connectible to the reservoir and operable to deliver solvent onto a windshield for a first predetermined number of wiper strokes after which said pump is automatically arrested, a power driven wiper unit operable to wipe the windshield, a control for the pump, a primary control for the wiper unit, and a secondary control for the wiper unit subservient to the pump control for actuating the wiper unit when the pump control is operated and to automatically continue operation of the wiper unit for a second predetermined number of wiper strokes after the pump has stopped.

6. A windshield cleaning apparatus including, a washer unit having an operative cycle of definite duration including a pump having a control, a wiper unit including a motor having a control, a wiper unit stroke control connected to the wiper control and to the washer unit to arrest the washer unit after a first predetermined number of strokes of said wiper unit and then arrest the wiper unit after a second predetermined number of strokes of said wiper unit beyond the cycle of operation of the washer unit, said stroke control being set in operation by the pump control.

7. A windshield cleaning system including a wiper unit, a washer unit, an electric motor having a continuous driving connection with said wiper unit so as to actuate said wiper unit upon energization, said motor also having an interruptible driving connection with said washer unit, means to render the driving connection between the motor and the washer unit operative to effect conjoint operation of the wiper unit and the washer unit, and means operable during said conjoint operation to continue operation of said washer unit for a predetermined number of strokes of said wiper unit and then automatically arrest said washer unit.

8. A windshield cleaning system including, a wiper unit, a washer unit having a pump, a motor having continuous driving connection with said wiper unit so as to actuate said wiper unit upon motor energization, an interruptible driving connection between said motor and said pump, control means for said motor for actuating said wiper unit independently of said pump, secondary control means for effecting conjoint operation of said wiper unit and said pump, and means operable during said conjoint operation to continue operation of said pump for a predetermined number of strokes of said wiper unit and then automatically arrest said pump.

9. A windshield cleaning system including a wiper unit, a washer unit including a pump, an electric motor having continuous driving connection with said wiper unit and an interruptible driving connection with said pump, primary control means for said motor for actuating said wiper unit independently of said pump, and secondary control means for said motor to effect conjoint operation of said wiper unit and said washer unit including means operable to automatically arrest said two units in sequential order to prolong wiper unit operation for a predetermined number of strokes after washer unit operation has stopped.

10. A windshield cleaning system including, a wiper unit, a washer unit including a pump, an electric motor unit, having a continuous driving connection with said wiper unit and an interruptible driving connection with said pump, control means for effecting conjoint operation of the wiper unit and the washer unit, and means to continue operation of the wiper unit for a predetermined number of strokes after the washer unit has stopped.

11. A windshield cleaning system including, a wiper unit, a washer unit having a pump, an electric motor having continuous driving connection with said wiper unit and an interruptible driving connection with said pump, a first circuit for energizing said motor to effect wiper unit operation independently of said washer unit, a second circuit for energizing said motor including means for establishing a driving connection between said motor and said pump so as to effect conjoint operation of said wiper unit and said washer unit, and means operable during said conjoint operation to continue operation of said washer unit for a predetermined number of strokes of said wiper unit and then automatically arrest said washer unit by interrupting the driving connection between said motor and said pump.

12. A windshield cleaning system including, a wiper unit, a washer unit having a pump, an electric motor having a continuous driving connection with said wiper unit and an interruptible driving connection with said pump, a first circuit for energizing said motor to effect operation of the wiper unit independent of said washer unit, a second circuit for energizing said motor including an electromagnet for establishing the driving connection between said motor and said pump to effect conjoint operation of the wiper unit and the washer unit, and means operable during said conjoint operation to continue operation of said washer unit for a predetermined number of strokes of said wiper unit and then automatically arrest said washer unit by interrupting the driving connection between said motor and said pump.

13. A windshield cleaning system including, a wiper unit, a washer unit having a pump, an electric motor having continuous driving connection with said wiper unit and an interruptible driving connection with said pump, a circuit for energizing said motor including means for establishing the driving connection between said motor and said pump for effecting conjoint operation of said wiper unit and said washer unit, and means driven by said motor during actuation of said pump for operating said pump through a cycle of a first predetermined number of strokes and prolonging wiper unit operation for a second predetermined number of strokes after washer unit operation has stopped.

14. A windshield cleaning system including, a wiper unit, a washer unit having a pump, an electric motor having a continuous driving connection with said wiper unit and an interruptible driving connection with said pump, a circuit for energizing said motor including an electromagnet for establishing the driving connection between said motor and said pump to effect conjoint operation of the washer unit and the wiper unit, and counting means actuated by said motor during such operation for maintaining said washer unit operative for a predetermined number of wiper unit strokes and thereafter automatically deenergizing said motor after the wiper unit has completed a second predetemined number of strokes beyond operation of the washer unit.

15. A windshield cleaning system including, a wiper unit, a washer unit, means to set both units in operation for conjoint operation, and counting means for continuing operation of said washer unit throughout a first predetermined number of strokes of said wiper unit and then automatically arresting the washer unit, said counting means continuing operation of said wiper unit for a second predetermined number of strokes after the washer unit has stopped.

16. A washer pump unit for a vehicle windshield including, a motor including a rotating element, a cam driven by said rotating element, a plunger having a follower engaging said cam so as to be reciprocated during rotation of said cam by said element, a washer pump including a reciprocable rod and a fluid displacing member having an intake stroke and a delivery stroke, spring means acting constantly on said rod for effecting the delivery stroke, means operatively interconnecting said rod and said plunger so as to effect said intake stroke upon reciprocation of said plunger, and means to interrupt the operative connection between said plunger and said rod.

17. A washer pump for a vehicle windshield including, a motor having a rotating element, a cam attached to the element, a plunger having a follower engaging said cam so as to be reciprocated during rotation thereof, a washer pump including a bellows having an intake stroke and a delivery stroke, a rod associated with the bellows for effecting the intake stroke, a bracket having a lost motion driving connection with said rod and a lost motion driving connecting with said plunger, and movable cam means engageable with said bracket in one position for preventing operation of said pump during reciprocation of said plunger.

18. A washer pump for a vehicle windshield including, a motor having a rotating element, a cam attached to said element, a reciprocating plunger having a follower engaging said cam so as to be reciprocated during rotation thereof, a ratchet wheel assembly including a ratchet wheel and a plurality of cams, said plunger including a drive pawl engageable with said ratchet wheel, a washer pump including a bellows and an actuating rod, spring means acting constantly on said bellows for effecting the delivery stroke thereof, a bracket having a lost motion driving connection with said actuating rod and a lost motion driving connection with said plunger for effecting the intake stroke of said bellows, and means on said bracket engageable with one of said cams on said ratchet wheel assembly for interrupting actuation of said bracket during reciprocation of said plunger.

19. The combination set forth in claim 18 including an electromagnet for an armature constituting a ramp for said drive pawl so as to prevent rotation of said ratchet wheel assembly by said pawl during deenergization of said electromagnet, and wherein momentary energization of said electromagnet establishes a driving connection between said pawl and said ratchet wheel after which the second cam on the ratchet wheel assembly maintains the driving connection between the drive pawl and the ratchet wheel operative for one complete revolution of said ratchet wheel assembly.

20. A windshield cleaning system including, a washer unit, a wiper unit, means to set both units in operation for conjoint operation, and means operable during said conjoint operation to continue operation of said washer unit for a predetermined number of strokes of said wiper unit and then automatically arrest said washer unit.

21. A windshield cleaning system including, a washer unit, a wiper unit, first manually operable control means for effecting independent operation of said wiper unit, second manually operable control means for effecting conjoint operation of said washer unit and said wiper unit, and means operable during said conjoint operation to continue operation of said washer unit for a predetermined number of strokes of said wiper unit and then automatically arrest said washer unit.

22. A windshield cleaning system including, a wiper unit, a washer unit, means to set both units in operation for conjoint operation, and stroke counting means actuated during said conjoint operation for continuing operation of said washer unit for a predetermined number of strokes of said wiper unit and then automatically arresting said washer unit.

23. A washer pump for a vehicle windshield including, a motor having a rotating element, a cam driven by said element, a reciprocating follower engaging said cam so as to be reciprocated during rotation thereof, a rotatable ratchet wheel assembly including a ratchet wheel and a cam, a reciprocating drive pawl operatively connected with said follower and engageable with said ratchet wheel, a washer pump including a fluid displacing member, resilient means acting constantly on said fluid displacing member and effecting one stroke thereof, and means connected to said fluid displacing member and having an interruptible driving connection with said follower for effecting the other stroke thereof, said driving connection being interrupted by said cam on said ratchet wheel assembly.

24. The washer pump set forth in claim 23 wherein said cam on said ratchet wheel assembly is of a predetermined angular extent whereby the driving connection between the means connected to said fluid displacing member and said follower will be interrupted during a predetermined angular movement of said ratchet wheel assembly.

References Cited in the file of this patent

UNITED STATES PATENTS

| 1,738,884 | Gearhart | Dec. 10, 1929 |
| 2,658,526 | Porter | Nov. 10, 1953 |

FOREIGN PATENTS

| 164,321 | Australia | July 25, 1955 |
| 537,304 | Great Britain | June 17, 1941 |